United States Patent
Herlihy et al.

(10) Patent No.: US 10,519,332 B2
(45) Date of Patent: Dec. 31, 2019

(54) WATERBASED UV INKJET INK CONTAINING SYNTHETIC THICKENER

(71) Applicant: SUN CHEMICAL CORPORATION, Parsippany, NJ (US)

(72) Inventors: Shaun Lawrence Herlihy, Somerset (GB); Sean Phillip Francis Mayers, Maidstone (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 15/762,162

(22) PCT Filed: Sep. 16, 2016

(86) PCT No.: PCT/US2016/052048
§ 371 (c)(1),
(2) Date: Mar. 22, 2018

(87) PCT Pub. No.: WO2017/053178
PCT Pub. Date: Mar. 30, 2017

(65) Prior Publication Data
US 2018/0273787 A1    Sep. 27, 2018

Related U.S. Application Data

(60) Provisional application No. 62/222,316, filed on Sep. 23, 2015.

(51) Int. Cl.
| | |
|---|---|
| *C09D 11/38* | (2014.01) |
| *C09D 11/101* | (2014.01) |
| *C09D 11/102* | (2014.01) |
| *B41M 5/00* | (2006.01) |
| *B41M 7/00* | (2006.01) |
| *C09D 11/106* | (2014.01) |
| *C09D 11/328* | (2014.01) |
| *D06P 5/30* | (2006.01) |
| *C08K 5/17* | (2006.01) |
| *C09D 5/16* | (2006.01) |
| *C09D 5/03* | (2006.01) |
| *C04B 41/45* | (2006.01) |
| *C09D 11/30* | (2014.01) |

(52) U.S. Cl.
CPC ........... *C09D 11/38* (2013.01); *B41M 5/0023* (2013.01); *B41M 7/0081* (2013.01); *C09D 11/101* (2013.01); *C09D 11/102* (2013.01); *C09D 11/106* (2013.01); *C09D 11/328* (2013.01); *D06P 5/30* (2013.01); *C04B 41/4539* (2013.01); *C08K 5/17* (2013.01); *C09D 5/037* (2013.01); *C09D 5/165* (2013.01); *C09D 11/30* (2013.01)

(58) Field of Classification Search
CPC ....... C09D 11/101; C09D 11/30; C09D 11/38; C09D 11/328; B41J 2/2107
See application file for complete search history.

(56) References Cited

U.S. PATENT DOCUMENTS

| | | | |
|---|---|---|---|
| 6,232,361 B1 | 5/2001 | Laskin et al. | |
| 6,927,014 B1* | 8/2005 | Figov | G03F 7/12 430/270.1 |
| 7,396,861 B2* | 7/2008 | Loccufier | C08F 2/46 427/508 |
| 2006/0062902 A1* | 3/2006 | Sager | B22F 1/0018 427/74 |
| 2008/0118677 A1 | 5/2008 | Bhatt et al. | |
| 2010/0285282 A1 | 11/2010 | Selman et al. | |
| 2011/0088581 A1* | 4/2011 | Crespi | C03C 8/16 101/483 |
| 2012/0315401 A1* | 12/2012 | Prampolini | C03C 8/16 427/387 |
| 2013/0037048 A1* | 2/2013 | Edgington | A62D 5/00 134/4 |
| 2013/0176369 A1* | 7/2013 | Gotou | B41J 2/2107 347/100 |
| 2015/0247044 A1 | 9/2015 | Brandstein et al. | |

FOREIGN PATENT DOCUMENTS

WO      2017/127050 A1    8/2014

OTHER PUBLICATIONS

International Preliminary report on Patentability issued in International Application No. PCT/US2016/052048, dated Mar. 27, 2018.
International Search Report issued in International Application No. PCT/US2016/052048, dated Dec. 7, 2016.
Written Opinion of the International Searching Authority issued in International Application No. PCT/US2016/052048, dated Dec. 7, 2016.

* cited by examiner

*Primary Examiner* — John Zimmermann
(74) *Attorney, Agent, or Firm* — Charles C. Achkar; Ostrolenk Faber LLP.

(57) ABSTRACT

The invention describes the use of a water-based energy curable inkjet ink or coating composition comprising one or more synthetic rheology modifiers, one or more energy curable resins, one or more tertiary amines, and water. The viscosity of the water-based energy curable inkjet ink or coating compositions is fine tuned to the requirements of the print head through the use of a synthetic thickener. The extremely low levels required of this type of material are particularly advantageous because they then have little if any impact on the physical properties of the dried and UV cured ink. Surprisingly, the use of s synthetic thickener at these low levels gives Newtonian character inks.

15 Claims, No Drawings

WATERBASED UV INKJET INK CONTAINING SYNTHETIC THICKENER

CROSS REFERENCE TO RELATED APPLICATIONS

This present application is a § 371 National Phase application based on PCT/US2016/052048 filed Sep. 16, 2016, which claims the benefit of U.S. Provisional Application No. 62/222,316, filed Sep. 23, 2015, the subject matter of each of which is incorporated by reference in its entirety.

FIELD OF THE INVENTION

The present invention is directed to a water-based, energy curable inkjet printing ink or coating composition, where the viscosity is adjusted by including synthetic rheology modifiers. The inkjet inks and coatings provided herein exhibit Newtonian characteristics.

BACKGROUND TO THE INVENTION

Waterbased inkjet inks for thermal and piezo inkjet print heads in home-office applications have been prevalent for decades, but are characterised by slow drying and poor resistance qualities. However, in industrial print applications involving multiple print-head arrays, UV cured inkjet inks are prevalent, where fast drying and high resistance properties are a key benefit. However, despite their numerous advantages, UV curable inkjet inks are well known to have problems due to the relatively high film thickness applied (e.g. 10-12 microns), which causes problems to the printer as a result of an uneven ink build across the web and distortion of the substrate roll in the machine. It is also well known that a potential solution to this problem is the use of a waterbased UV curable ink, which initially deposits a similar film thickness to 100% UV inks (e.g. 10-12 microns), but when the inks have been dried prior to UV curing, the film thickness is reduced to only a few microns, and therefore drastically limits the roll distortion whilst maintaining many of the positive product resistance properties associated with UV curable inks.

The viscosity requirements for industrial print applications vary by print head manufacturer, depending on design principles and the flow requirements within the print head channels. For single pass systems, requirements tend to be lower (6 mPas or less) due to the higher degree of print head integration that is required to achieve higher nozzle density in two-dimensional arrays utilising thin-film actuators, as exemplified by Dimatix Samba and the Kyocera KJB-Z. In graphics applications, print heads are commonly based on bulk piezoelectric actuators in linear arrays and the typically larger drop size regimes tend to lead to higher optimal viscosities of 8 mPas and above to achieve good drop formation and desired level of jetting reliability. The Dimatix Q-class designs and Ricoh MH print head families are examples of this, although Xaar and other chevron actuator heads such as Konica Minolta, Toshiba Tec and SII Printek also are in this range.

One significant limitation of aqueous UV technology is that the high levels of water that are desirable in the formulation lead to a particularly low ink viscosity (typically 2-3 mPas at 32° C.). Adjusting the ink to achieve an acceptable print viscosity in commercial inkjet heads (typically 4-9 mPas at 32° C.) then represents a significant problem, since it is difficult to tailor a single formulating strategy to cover such a wide range of application viscosities. Several approaches to increasing the viscosity would be easily known to those skilled in the art, but these have consequential problems which may not necessarily be problematic in a pure water-based inkjet ink. But in a waterbased UV ink where final product resistance characteristics are a key measure of performance, they are of enormous significance. Examples of some techniques for increasing viscosity, and the problems associated therewith include:

1. Increased co-solvent levels. This can significantly increase the viscosity of the ink formulation, but care needs to be taken because of the deleterious effect this then has on the drying performance of the ink, where significant extra expense and space is required to accommodate increased drying capacity of the equipment. As well as increased solvent emission concerns, in many cases, the solvents can also have a negative impact on the stability of the pigment dispersion.
2. Increased resin content. The typical resin used in these formulations is an aqueous polyurethane dispersion. Polyurethane dispersions themselves are low viscosity and have limited viscosity altering impact on the formulation. It has also been demonstrated that jetting performance is adversely affected at higher solids levels.
3. Water-soluble polymers. Materials commonly used by those skilled in the art would include things like polyethylene glycol. Whilst this type of material is somewhat effective at increasing viscosity, in order to achieve the several mPas increase in viscosity required, 5-10% addition of these materials is often necessary, which can significantly impair the physical properties of the dried and cured ink, since, after drying, they may make up as much as 30-50% of the dried ink film. Other water-soluble polymers such as polyvinylpyrrolidone can also be used, but can also seriously affect the UV cure properties as well as the jetting efficiency.
4. Reduce jetting temperature. UV curable inkjet inks are typically jetted at a temperature of 40-50° C. but water-based and water-based UV are already typically jetted at a lower temperature of around 32° C., and further reduction in temperature would have implications on the design of inkjet heads in order to avoid condensation from a necessary cooling circuit.

Rheology modifiers are organic or inorganic coating additives that control the rheological characteristics of the liquid formulation. In coatings technology, rheology modifiers are mainly used to provide either pseudoplastic or thixotropic properties. These can be divided into inorganic and organic materials; inorganic additives are typically clays, and fumed silicas, whereas organic materials can be subdivided into natural materials such as cellulosics/xanthan gum and synthetic materials which are then associative or non-associative type materials.

Inorganic rheology modifiers are typically dispersed into a coating and function as suspended or gelling agents. Usually the viscosity of the formulation decreases with time and the constant shear conditions as its gel structure is broken down. If this shear is removed, the coating gradually recovers to its original viscosity. Inorganic rheology modifiers are sometimes added to aqueous formulations as secondary thickeners to improve the anti-sag, anti-settling, anti-synerisis and anti-spattering properties of the coating.

Organic rheology modifiers are more diverse in nature and subdivide into many structural types. Non-associative rheology modifiers act by entanglement of soluble, high molecular weight polymer chains and thus their effectiveness is mainly controlled by the molecular weight. These tend to have pseudoplastic rheology, giving good stabilisation against settling and sagging, and therefore find significant use in non-drip gloss type paint applications. Associative thickeners function by non-specific interactions of hydrophobic end groups with both themselves and components of the coating. Thus, they form a physical network. According to the BYK technical information leaflet Optiflo—water-soluble, associative thickener for aqueous formulations; "associative thickeners greatly increase viscosity, especially under high shear conditions. This strengthens the internal structure, thickens the material to a honey-like consistency, a process also described as brush drag".

Thickeners typically used for water-based systems include cellulosics, acrylic thickeners (alkali swellable emulsions ASE, hydrophobically modified alkali swellable emulsions HASE), hydrophobically modified polyurethanes HEUR, hydrophobically modified polyethers HMPE, and specialty clays.

Although some suppliers characterise thickeners in terms of their degree of Newtonian behaviour, it would be appreciated by those skilled in the art that this is still a relative concept for a rheology modifier whose primary purpose is to improve levelling, anti-spatter and brush/roll application performance. As such, one of ordinary skill in the art would expect that a Newtonian fluid would not have any impact on performance for these criteria and that all thickeners have the purpose of imparting non-Newtonian rheology modification.

Natural and synthetic rheology modifying agents have been used in water-based, non-energy curable inks. For example, EP 1464686, US 2010/041816, WO 2011/079402, WO 2009/104042, and WO 2015/152862, all disclose water-based inks comprising rheology modifying agents. However, the inks described are not energy curable.

EP 1464686 discloses an ink for a ballpoint pen which has high viscosity at low shear rates to stop the ink flowing during writing pauses, and low viscosity at high shear rates to ensure suitable ink feeding during fast writing.

EP 2184329 describes an ink for inkjet or screenprinting which is based on a water diluted UV curable resin and optionally contains a thickener. The thickeners described are sodium alginate, sodium carboxymethylcellulose or polyurethane solution. However, the patent only describes and claims the use of such thickeners in a version of the invention which is the screen ink formulation, where pseudoplastic behaviour is desirable and is a general characteristic of all screen inks. The patent does not disclose the use of such thickeners in an inkjet ink.

US 2010/0041816 describes water-based inkjet inks which contain a water-soluble polymer thickener. The water-soluble thickener is selected from the group consisting of polyvinyl alcohol, polyvinylpyrrolidone, polyoxyethylene glycol or a polyoxyethylene/poly oxypropylene block polymer. A number of these materials are included in the examples but the use of thickeners as described in this invention is not disclosed.

Note that the use of polyvinyl alcohols was discounted within the UV curable water-based formulations of the present invention because they were either insoluble, unstable or had a significant deleterious effect on jetting performance. Polyoxyethylene/polyoxypropylene block copolymers were also investigated within the present invention and found to be satisfactory from the point of view of ability to increase viscosity, but the levels required to achieve viscosity targets determined by the print head were such that there was a significant negative effect on the performance properties of the dried and cured ink.

EP 2703458 discloses a photocurable ink composition for aqueous UV curing inkjet applications containing a water-based polyurethane dispersion, water, photoinitiator, colorant and hydrophobic radiation curable monomers. The application describes the optional use of several additives, including rheology modifiers. But there is no reduction to practice for this, with no examples containing any rheology modifiers.

Lamont, et al. describe the use of inkjet inks with added 1% polystyrene solution as rheology modifiers to provide a nearly twofold gain in viscosity, with the largest viscosity gains coming from the polymer with the highest molecular weight. However, these high molecular weight additives gave reduced jetting performance and solvent compatibility issues. Such an approach with a largely water-based ink of the present invention would be wholly unsatisfactory for reasons of compatibility. *Organic electronics* (2015), 17, 107-114—tuning the viscosity of halogen free bulk hetero junction inks for inkjet printed organic solar cells (SciFinder abstract).

WO 2011/079402 describes an aqueous ink set which is relatively high viscosity prior to printing and just after printing but which shear thins as it passes through the head of the inkjet printer in response to shear stress. The inkjet ink is not Newtonian in character. In addition, these inks are not suitable for UV curing.

WO 02/066571 discloses energy curable pressure sensitive adhesives that contain a thickening or thixotropic additive. The adhesives are in an initial gel state, but change to a low viscosity fluid when subjected to a threshold of suitable energy (e.g. shear, thermal, sonic). Many different rheology modifiers are disclosed, with surface treated inorganic oxide particles being preferred.

Thus an unsolved problem exists, which is to create small absolute, but large relative increases in viscosity of water-based and UV curable inkjet inks, without negatively impacting performance. This may be done via the addition of a very low level of an additive that itself preferably imparts minimal change to the drying, curing and physical properties of the ink once dried and UV cured, and allows a fundamentally similar product formulation strategy to be tailored for use across a wide number of different printheads.

SUMMARY OF THE INVENTION

The present invention provides water-based energy curable inkjet ink and coating compositions comprising small amounts of synthetic thickeners as rheology modifying agents. Addition of the small amounts of the synthetic thickeners gives a small rise in viscosity, but the inks maintain Newtonian characteristics. This is surprising because these rheology modifiers are typically used as thixotropic, shear thinning additives (i.e. to impart non-Newtonian characteristics). Consequently, the compositions of the present invention can be tailored to individual inkjet head viscosity requirements, with no negative effect on either the printing properties of the ink, or the physical properties of the dried and cured ink.

In a particular aspect, the present invention provides a water-based energy curable inkjet ink or coating composition comprising:
 a) 0.1 wt % to 3 wt % one or more synthetic rheology modifiers;
 b) 15 wt % to 45 wt % one or more energy curable resins;
 c) 0.1 wt % to 4 wt % one or more tertiary amines; and
 d) 20 wt % to 80 wt % water;

wherein the water-based energy curable inkjet ink or coating composition has a pH of 7.0 to 9.5.

The present invention also provides a method of preparing a water-based energy curable inkjet ink or coating composition, comprising the steps of:
a) mixing one or more synthetic rheology modifiers, one or more energy curable resins, one or more tertiary amines, and water; and
b) adjusting the pH to 7.0 to 9.5.

The present invention also provides a printed article comprising a composition according to the present invention.

Additionally the present invention provides a process of preparing a printed article comprising:
a) applying the water-based energy curable inkjet ink or coating composition on a substrate;
b) drying the water based energy curable inkjet ink or coating composition; and
c) curing the water-based energy curable inkjet ink or coating composition.

These and other objects, advantages, and features of the invention will become apparent to those persons skilled in the art upon reading the details of the methods and formulations as more fully described below.

DETAILED DESCRIPTION

The present invention describes the use of a waterbased UV curable inkjet ink or coating composition where the viscosity is fine tuned to the requirements of the print head through the use of a synthetic thickener. The extremely low levels required of this type of thickener material are particularly advantageous because they then have little, if any, impact on the physical properties of the dried and UV cured ink. Surprisingly, the use of a synthetic thickener at these low levels gives Newtonian character inks.

Definitions

In the present application, the use of the singular includes the plural unless specifically stated otherwise. As used herein, the singular forms "a," "an" and "the" are intended to include the plural forms as well, unless the context clearly indicates otherwise.

In the present application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, the term "alkyl" refers to straight chain and branched saturated non-cyclic hydrocarbons, having from 1 to 4 carbon atoms. Representative straight chain alkyl groups include methyl, -ethyl, -n-propyl, and -n-butyl, and the like.

As used herein, the term "alkoxy" means a straight chain or branched non-cyclic hydrocarbon having one or more ether groups and from 1 to 4 carbon atoms. Representative straight chain and branched alkoxys include -methoxy, -ethoxy, -propoxy, -butyloxy, and the like.

As used herein, the term "halogen" refers to chloro, fluoro, bromo, or iodo.

As used herein, an "energy curable" or "radiation curable" ink or coating composition is a composition that can be cured by any suitable source of actinic radiation. Suitable sources of UV radiation include, but are not limited to, medium or high pressure mercury arc lamps, optionally with a dope metal such as iron, tin or gallium also present, a xenon bulb, a carbon arc lamp, a metal halide bulb, iron-doped lamps, a UV-LED lamp, typically emitting at between 365 nm and 405 nm, or sunlight. Other sources of radiation include, but are not limited to, microwave, infrared, electron beam, visible light, x-ray, laser, and the like.

As used herein, "synthetic rheology modifiers" or "synthetic thickeners" are man-made polymers such as acrylic-based polymers, urethane based polymers, polyether polymers, carbomers, modifications thereof, and the like. Examples of synthetic thickeners include acrylic-based polymers such as alkali swellable emulsions (ASE) and hydrophobically modified alkali swellable emulsions (HASE); hydrophobically modified urethanes (HEUR); hydrophobically modified polyethers (HMPE); and hydrophobic ethoxylated aminoplast technology (HEAT).

As used herein, "natural rheology modifiers" or "natural thickeners" are naturally occurring polymers comprised of polysaccharide or amino acid building blocks, and are generally water-soluble. For example, natural thickeners include starch, cellulose, sodium carboxymethylcellulose (CMC), polysaccharides, alginate, egg yolk, agar, arrowroot, carrageenan, collagen, gelatin, guar gum, pectin, xanthan gum, and the like.

As used herein, the term "Newtonian" refers to a fluid characterized in that the viscosity remains constant at a given temperature, regardless of shear rate. That is, the relationship between the shear stress and shear rate is constant. Typical examples of Newtonian fluids are water and thin motor oils.

As used herein, the term "non-Newtonian" refers to a fluid characterized in that the relationship between shear stress and shear rate is not constant. That is, the viscosity will either decrease (pseudoplastic) or increase (dilatant) as the shear rate increases. In some instances, a non-Newtonian fluid will display a change in viscosity with time under conditions of constant shear rate (thixotropic).

Water-based Energy Curable Inkjet Ink or Coating Composition

The present invention provides water-based energy curable inkjet ink or coating compositions comprising synthetic rheology modifiers in small amounts. The inks and coatings of the present invention have a small absolute, but high relative, increase in viscosity compared to inks and coatings not containing the rheology modifiers. Advantageously, the rheology modifiers are added in such amounts that the inks and coatings of the invention exhibit Newtonian characteristics.

In a particular aspect, the present invention provides a water-based energy curable inkjet ink or coating composition comprising:
- a) 0.1 wt % to 3 wt % one or more synthetic rheology modifiers;
- b) 15 wt % to 45 wt % one or more energy curable resins;
- c) 0.1 wt % to 4 wt % one or more tertiary amines; and
- d) 20 wt % to 80 wt % water;

wherein the water-based energy curable inkjet ink or coating composition has a pH of 7.0 to 9.5.

The present invention also provides a method of preparing a water-based energy curable inkjet ink or coating composition, comprising the steps of:
- a) mixing one or more synthetic rheology modifiers, one or more energy curable resins, one or more tertiary amines, and water; and
- b) adjusting the pH to 7.0 to 9.5.

The present invention also provides a a printed article comprising a composition according to the present invention.

Additionally the present invention provides a process of preparing a printed article comprising:
- a) applying the water-based energy curable inkjet ink or coating composition on a substrate;
- b) drying the water-based energy curable inkjet ink or coating composition; and
- c) curing the water-based energy curable inkjet ink or coating composition.

It is understood that the inks of the present formulation could contain a wide range of raw materials that are compatible with either or both energy curable and water-based ink systems. These materials include, but are not limited to, polymers and resins, monomers, oligomers, solvents, colorants, photoinitiators, amine synergists, surface control additives, defoamers, biocides, etc.

The inks of the present invention comprise one or more synthetic rheology modifiers. Synthetic rheology modifiers include non-associative rheology modifiers, and non-ionic associative type rheology modifiers, also known as a non-ionic associative thickeners. Examples of non-associative rheology modifiers include, but are not limited to, alkali swellable emulsions (ASE), such as acrylic emulsions. Suitable associative rheology modifiers include, but are not limited to, hydrophobically modified alkali swellable emulsions (HASE), such as hydrophobically modified acrylic emulsions, hydrophobically modified polyurethanes (HEUR); hydrophobically modified polyethers (HMPE); or hydrophobic ethoxylated aminoplast technology (HEAT). Of these, ASE and HASE technologies are particularly preferred.

Examples of HEUR technologies include, but are not limited to, Rheovis PU 1190, PU 1191, PU 1291, PU 1241 and PU 1331 from BASF, Rheolate 212, 255, 655, 278, 678, 288, 299 and 475 from Elementis Specialities, Acrysol RM-3000, RM-895, RM-12W, RM-995, SCT-275, RM-845, RM-825, RM-6000, RM-5000, RM 2020E, RM-8W, RM-725, ACULYN 44 and ACULYN 46 from Dow Chemical, Optiflo T 1000, L 1400, M 2600 VF and H 7500 VF from BYK, TEGO ViscoPlus range from TEGO Evonik and Tafigel PUR 61, PUR 50 and PUR 85 from Munzing.

Examples of HMPE technology include, but are not limited to, Rheovis PE 1331 and Rheovis PE 1320 from BASF.

Examples of HEAT technology include, but are not limited to, Optiflo L 100, H 370 VF, H 600 VF and TVS-VF from BYK.

Examples of ASE include, but are not limited to, ACULYN™ 33 and ACULYN™ 38 from Dow Chemical.

Examples of HASE include, but are not limited to, ACULYN™ 22 and ACULYN™ 28 from Dow chemical.

These synthetic rheology modifiers are present in an amount of about 0.1 wt % to 3.0 wt %, based on the total weight of the ink or coating composition. For example, the synthetic rheology modifiers may be present in an amount of about 0.1 wt % to 2.5 wt %; or about 0.1 wt % to about 2.0 wt %; or about 0.1 wt % to about 1.5 wt %; or about 0.1 wt % to about 1.0 wt %; or about 0.1 wt % to about 0.5 wt %; or about 0.5 wt % to about 3.0 wt %; or about 0.5 wt % to about 2.5 wt %; or about 0.5 wt % to about 2.0 wt %; or about 0.5 wt % to about 1.5 wt %; or about 0.5 wt % to about 1.0 wt %. In certain embodiments, the rheology modifiers will be present in an amount of about 0.1 wt % to about 2.0 wt %. In other embodiments, the rheology modifiers will be present in an amount of about 0.1 wt % to about 1.0 wt %.

The inks and coatings of the invention comprise one or more energy curable resins or polymers. The energy curable resins and polymers are preferably water-soluble, or dispersible in water either as a liquid in liquid emulsion or particle suspension. The energy curable resins or polymers are present in an amount of about 15 wt % to about 45 wt %, based on the total weight of the ink or coating composition. For example, the one or more energy curable resins or polymers may be present in an amount of about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 45 wt %; or about 20 wt % to about 40 wt %; or about 20 wt % to about 35 wt %; or about 20 wt % to about 30 wt %; or about 20 wt % to about 25 wt %. For example, the resin or polymer would preferably be present in an amount of about 15 wt % to 45 wt %; or about 15 wt %; to about 30 wt %; or about 20 wt % to about 45 wt %; or about 20 wt % to about 30 wt %; or about 20 wt % to about 25 wt %.

The ink formulations are typically based on the use of acrylated polyurethane dispersions such as those supplied as IRR813, and MS 10/1311 (from Allnex); Neorad R-440, R-441, R-444, R-447, R-448, R-465, UV-14, UV-20, UV-65, and UV-TN6711 (from DSM); Laromer LR8949, LR8983, LR9005, UA 9059, UA9060, UA9064, and UA9095 (from BASF); and Bayhydrol UV 2282, UV 2317, UV VP LS 2280, UV VP LS 2317, UV XP 2629, UV XP 2687, UV XP 2689, UV XP 2690, and UV XP 2775 (from Bayer).

It is also possible for a skilled formulator to create similarly functional products based on the use of other acrylate and non-functional resin technologies. Possibilities in this area would include acrylated polyester dispersions such as the Laromer PE range from BASF; water soluble epoxy acrylates such as Laromer 8765 from BASF and CN132 from Sartomer; styrene maleic anhydride adducts (SMA) where the anhydride group of a styrene-maleic copolymer is reacted with a OH-functional monomer; acetoacetate-functional polymers such as acetoacetate-functional poly(vinyl alcohol) such as Gohsenx Z from Nippon Gohsei; acrylic emulsions such as those sold under the trade names Joncryl (BASF), Revacryl (Synthomer), Hycar (Lubrizol), Neocryl (DSM), Neboplast (Necarbo), and the Picassian AC range (Picassian Polymers); solution acrylics such as those sold under the trade names Joncryl (BASF); poly (meth)acrylic acid such as those sold under the trade name Sokalan (BASF); polyurethane dispersions such as those sold under the trade names Sancure (Lubrizol), Syntegra (Dow), Luplen (BASF), and Beetafin (BIP); polyester emulsions such as those sold under the trade names Eastek (Eastman); PVC emulsions such as those sold under the trade names Vycar (Lubrizol); polyamide dispersions such as those sold under the trade names Casamid (Thomas Swann) and Hydrosize (Michelman); water-based alkyds such as those sold under the trade names Synaqua (Arkema); poly(vinyl alcohol) such as those sold by Kuraray, Nippon Gohsei & Celanese; polyethylene glycols; poly(vinyl pyrrolidones) such as those sold under the trade names PVP-K15, K30, K60, K90 (ISP); maleic resins such as those sold under the trade names Hydrorez (Lawter); and natural resins such as water-based shellacs (Worlee), Procote (DOW), and Revertex (Synthomer).

These various resin types may, where applicable, be neutralized using organic bases, including, but not limited to, ammonia, triethanolamine, triisopropanolamine, dimethyl aminoethanol or arginine. Alternatively, they may be neutralised by an inorganic base including but not limited to alkali metal oxides, alkali metal hydroxides or alkali metal carbonates, with sodium hydroxide or potassium hydroxide being the preferred inorganic bases. Where tertiary amines such as triethanolamine are used as neutralising agents, they will serve a dual function as both neutralising agent, aiding the solubility of the photoinitiator, and as an amine synergist actively involved in the production of free radicals with the photoinitiator. If desired, it would also be possible to use an inorganic base as an additional component in the composition to aid the solubility of the thioxanthone photoinitiator, although this would not be the preferred approach.

The ink composition according to the present invention includes water. This would preferably not contain ionic impurities and is therefore preferably ion exchanged or distilled water. The quantity of water used according to the present invention includes that which is supplied as part of raw materials used. Advantageously, the water-based energy curable inks contain about 20 wt % to 80 wt % of water, based on the total weight of the ink or coating composition. For example, the water may be present in an amount of about 20 wt % to about 75 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %. Preferably, the inks contain about 30 wt % to about 70 wt % water.

Advantageously, one or more tertiary amines are present in an amount of from about 0.1 wt % to about 4 wt %, based on the total weight of the ink or coating composition. For example, the tertiary amines may be present in an amount of from about 0.1 to 3.5 wt %; from about 0.1 to about 3 wt %; or from about 1 to about 2.5 wt %; or from 0.1 wt % to about 2 wt %; or about 0.1 wt % to abut 1.5 wt %; or about 0.1 wt % to about 1 wt %; or about 0.1 wt % to about 0.5 wt %. The one or more tertiary amines may be used as a neutralizing agent, or may be used as tertiary amine synergists when photoinitiators are included in the composition.

Suitable examples of tertiary amines include, but are not limited to, the following: aromatic amines, such as 2-(dimethylamino)ethylbenzoate, benzoic acid, 4-(dimethylamino)-1, 1'-[(methylimino)di-2,1-ethanediyl] ester, and simple alkyl esters of 4-(N,N-dimethylamino)benzoic acid, with ethyl, amyl, 2-butoxyethyl and 2-ethylhexyl esters being particularly preferred, and other positional isomers of N,N-dimethylamino)benzoic acid esters are also suitable; aliphatic amines such as N-methyldiethanolamine, triethanolamine and triisopropanolamine; aminoacrylates and amine modified polyether acrylates EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 ex DSM-AGI.

The inks can also contain other additives normally used in ink and coating compositions. For example, the inks could contain one or more water compatible solvents, one or more water soluble monomers, and one or more additional photoinitiators.

The water-based energy curable ink can contain one or more water compatible solvents, preferably in an amount of from about 0 wt % to about 40 wt %, based on the total weight of the ink or coating composition. For example, the one or more water compatible solvents may be present in an amount of about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 40 wt %; or about 15 wt % to about 35 wt %; or about 15 wt % to about 30 wt %; or about 15 wt % to about 25 wt %; or about 15 wt % to about 20 wt %. Preferably, the inks contain about 1 wt % to about 30 wt % water compatible solvents.

The one or more water-compatible organic solvents have a primary function as a humectant, preventing drying of the ink in the inkjet heads and thus preventing them from clogging, and a secondary function as a wetting aid, allowing the inkjet drops to spread on the substrate. Examples of suitable solvents would include materials which are not highly flammable or volatile, typically an alkylene glycol ether or ether acetate type, with the following non-limiting examples: 4-hydroxy-4-methyl-2-pentanone, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, tripropylene glycol, tripropylene glycol methyl ether, and the like.

The water-based energy curable inks may also contain one or more water soluble monomers. The water soluble monomers may be present in an amount of from about 0 wt % to about 15 wt %, based on the total weight of the ink or coating composition. For example, the water soluble monomers may be present in an amount of from about 1 wt % to about 15 wt %; or about 1 wt % to about 10 wt %; or from about 1 wt % to about 5 wt %; or from about 2 wt % to about 15 wt %; or from about 2 wt % to about 10 wt %; or from about 2 wt % to about 5 wt %.

A partial, non-limiting, list of some of the meth(acrylate) monomers that could be used to formulate the inks of the present invention is included below. This includes both materials that are fully water soluble and therefore easy to use, such as polyethylene glycol 400 diacrylate, and materials which would be classed as insoluble or have limited water compatibility, but are capable of being used by those with good formulating expertise, possibly co-solvents to aid compatibility.

Examples of suitable monofunctional ethylenically unsaturated monomers include, but are not limited to, the following, where the term ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts. Suitable compounds include, but are not limited to, isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof; and the like.

Examples of suitable multifunctional ethylenically unsaturated monomers include but are not limited to the following, where the term ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts. Suitable compounds include, but are not limited to, 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; combinations thereof; and the like.

Other functional monomer classes capable of being used in part in these formulations at a level between 0 and 40 percent by mass according to the entire ink composition include cyclic lactam such as N-vinyl caprolactam, and N-vinyl pyrrolidone, and secondary or tertiary acrylamides such as acryloyl morpholine, diacetone acrylamide, N-methyl acrylamide, N-ethyl acrylamide N-isopropyl acrylamide, N-t-butyl acrylamide, N-hexyl acrylamide, N-cyclohexyl acrylamide, N-octyl acrylamide, N-t-octyl acrylamide, N-dodecyl acrylamide, N-benzyl acrylamide, N-(hydroxymethyl)acrylamide, N-isobutoxymethyl acrylamide, N-butoxymethyl acrylamide, N,N-dimethyl acrylamide, N,N-diethyl acrylamide, N,N-propyl acrylamide, N,N-dibutyl acrylamide, N,N-dihexyl acrylamide, N,N-dimethylamino methyl acrylamide, N,N-dimethylamino ethyl acrylamide, N,N-dimethylamino propyl acrylamide, N,N-dimethylamino hexyl acrylamide, N,N-diethylamino methyl acrylamide, N,N-diethylamino ethyl acrylamide, N,N-diethylamino propyl acrylamide, N,N-dimethylamino hexyl acrylamide, and N,N'-methylenebisacrylamide, and the like. Of these, diacetone acrylamide is particularly preferred.

The water-based energy curable inks may also contain one or more photoinitiators. The one or more photoinitiators may be present in an amount of from about 0 wt % to about 5 wt %, based on the total weight of the ink or coating composition. For example, the one or more photoinitoators may be present in an amount of about 0.1 wt % to about 5 wt %; or about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.5 wt % to about 5 wt %; or about 0.5 wt % to about 4.5 wt %; or about 0.5 wt % to about 4 wt %; or from about 0.5 wt % to about 3.5 wt %; or from about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %. In one embodiment, the one or more photoinitiators are present in an amount of about 0.5 wt % to about 2.0 wt %.

Suitable photoinitiators include, but are not limited to, the following: α-hydroxyketones such as 1-hydroxy-cyclohexyl-phenyl-ketone, 2-hydroxy-2-methyl-1-phenyl-1-propanone, 2-hydroxy-2-methyl-4'-tert-butyl-propiophenone, 2-hydroxy-4'-(2-hydroxyethoxy)-2-methyl-propiophenone, 2-hydroxy-4'-(2-hydroxypropoxy)-2-methyl-propiophenone, oligo 2-hydroxy-2-methyl-1-[4-(1-methyl-vinyl)phenyl]propanone, bis[4-(2-hydroxy-2-methylpropionyl)phenyl]methane, 2-hydroxy-1-[1-[4-(2-hydroxy-2-methylpropanoyl)phenyl]-1,3,3-trimethylindan-5-yl]-2-methylpropan-1-one, and 2-hydroxy-1-[4-[4-(2-hydroxy-2-methylpropanoyl)phenoxy]phenyl]-2-methylpropan-1-one; acylphosphine oxides, such as 2,4,6-trimethylbenzoyl-diphenylphosphine oxide, ethyl (2,4,6-trimethylbenzoyl)phenyl phosphinate, and bis-(2,4,6-trimethylbenzoyl)-phenylphosphine oxide; α-aminoketones, such as 2-methyl-1-[4-methylthio)phenyl]-2-morpholinopropan-1-one, 2-benzyl-2-dimethylamino-1-(4-morpholinophenyl)-butan-1-one, and 2-dimethylamino-2-(4-methyl-benzyl)-1-(4-morpholin-4-yl-phenyl)-butan-1-one; thioxanthones, such as 2-4-diethylthioxanthone, isopropylthioxanthone, 2-chlorothioxanthone, and 1-chloro-4-propoxythioxanthone; benzophenones, such as benzophenone, 4-phenylbenzophenone, and 4-methylbenzophenone, methyl-2-benzoylbenzoate; 4-benzoyl-4-methyldiphenyl sulphide, 4-hydroxybenzophenone, 2,4,6-trimethyl benzophenone, 4,4-bis(diethylamino) benzophenone, benzophenone-2-carboxy(tetraethoxy) acrylate, 4-hydroxybenzophenone laurate, and 1-[-4-[benzoylphenylsulpho]phenyl]-2-methyl-2-(4-methylphenylsulphonyl)propan-1-one; phenylglyoxylates, such as phenyl glyoxylic acid methyl ester, oxy-phenylacetic acid 2-[hydroxyl-ethoxy]-ethyl ester, or oxy-phenylacetic acid 2-[2-oxo-2-phenyl-acetoxy-ethoxy]-ethyl ester; oxime esters, such as 1-phenyl-1,2-propanedione-2-(O-ethoxycarbonyl)oxime, [1-(4-phenylsulfanylbenzoyl)heptylideneamino]benzoate, or [1-[9-ethyl-6-(2-methylbenzoyl)carbazol-3-yl]-ethylideneamino]acetate.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitiser Omnipol SZ from IGM.

The water-based energy curable inkjet inks are generally alkaline. Preferably, the pH of the ink is greater than or equal to about 7.0. Preferably, the pH of the ink is less than or equal to about 9.5. For example, the pH of the ink can be between 7.0 and 9.5. For example, the pH of the ink can be 7.0, 7.5, 8.0, 8.5, 9.0, or 9.5.

Advantageously, the present invention provides a printed article comprising the alkaline energy curable water-based inkjet ink or coating composition. The substrate of which the printed article is made is not restricted. Any substrate that is suitable for inkjet printing can be used. For example, the substrate may be paper, paperboard, polymer films, plastic, metal, glass, ceramic, etc.

The curing of the inks of the present invention may involve the use of either medium pressure mercury arc lamps, which are optionally doped with metal such as iron, gallium or tin, or, optionally through the use of UV light emitting diodes (LED) which are commercially available at a number of emission wavelengths (405, 395, 385, 375, 365 nm) with 395 nm or 385 nm being preferable. The use of a medium pressure mercury arc lamp is preferred. An additional lamp technology which may be useful for drying these inks is the low energy UV drying lamps sold by Colorific under the brand name "Light Bar". It is further suggested that the thermal load on the substrate can be reduced to an even greater extent if the use of a near Infrared (NIR) drying lamp (such as described in US20090120361) is employed in combination with a UV LED curing lamp.

Photoinitiators which are suitable where the light source is an LED type would preferably be acyl phosphine oxides, including but not limited to, 2,4,6-trimethylbenzoyl-diphenylphosphine oxide; 2,4,6-trimethylbenzoyl-diphenyl phosphinate; bis(2,4,6-trimethylbenzoyl)-phenylphosphine oxide; and the like. Other possible photoinitiators include thioxanthone photoinitiators such as 2-4-diethylthioxanthone, isopropylthioxanthone, 2-chlorothioxanthone, 1-chloro-4-propoxythioxanthone, 2-carboxymethoxy thioxanthone, GENOPOL TX1 from Rahn, OMNIPOL TX or OMNIPOL 3TX from IGM, SPEEDCURE 7010 from Lambson; bis dialkylamino benzophenones such as 4 4,4-bis(diethylamino)benzophenone; anthraquinones such as 2-ethyl anthraquinone; and the like.

It is also possible to use certain photoinitiators such as α-aminoketones, which are well known to undergo triplet energy transfer processes with certain thioxanthones, and which can be included as useful, even though they may not themselves have any significant light absorption at the LED emission wavelength. Examples include, but are not limited to, 2-methyl-1-[4-(methylthio)phenyl]-2-morpholinopropan-1-one; 2-benzyl-2-dimethylamino-1-(4-morpholinophenyl)-butanone-1; 2-dimethylamino-2-(4-methyl-benzyl)-1-(4-morpholin-4-yl-phenyl)-butan-1-one; and Omnirad 910 from IGM resins; and the like.

Since the inks of the current invention are primarily water-based in nature, it is also preferable to include a biocide or anti-mold agent. When present, biocides are typically present in an amount of about 0.01 wt % to about 5 wt %, based on the total weight of the ink or coating composition. For example, the biocide may be present in an amount of about 0.01 wt % to about 4 wt %; or about 0.01 wt % to about 3 wt %; or about 0.01 wt % to about 2.5 wt %; or about 0.01 wt % to about 2 wt %; or about 0.01 wt % to about 1 wt %. Suitable examples include products based on the following biocide structural types: benz-isothiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. Vanderbilt), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. When present, defoamers are typically present in an amount of about 0.01 wt % to about 5 wt %, based on the total weight of the ink or coating composition. For example, the defoamers may be present in an amount of about 0.01 wt % to about 4 wt %; or about 0.01 wt % to about 3 wt %; or about 0.01 wt % to about 2.5 wt %; or about 0.01 wt % to about 2 wt %; or about 0.01 wt % to about 1 wt %. Defoamers are particularly important with recirculating print heads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, ADO1, DF-110, DF-58, DF-62, DF-66, DF-695, DF-70, and MD-20 are available from Air Products.

Surface control additives are often optionally used to control the surface tension of the ink, which is required to adjust the wetting on the face plate of the print head, and also to give the desired drop spread on the substrate, or, in the case of multi pass inkjet printing, wet on dry drop spread. When present, surface control additives are typically present in an amount of about 0.01 wt % to about 5 wt %, based on the total weight of the ink or coating composition. For example, the surface control additives may be present in an amount of about 0.01 wt % to about 4 wt %; or about 0.01 wt % to about 3 wt %; or about 0.01 wt % to about 2.5 wt %; or about 0.01 wt % to about 2 wt %; or about 0.01 wt % to about 1 wt %. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Included in the ink formulation can optionally be a suitable de-aerator. When present, de-aerators are typically present in an amount of about 0.01 wt % to about 5 wt %, based on the total weight of the ink or coating composition. For example, the de-aerators may be present in an amount of about 0.01 wt % to about 4 wt %; or about 0.01 wt % to about 3 wt %; or about 0.01 wt % to about 2.5 wt %; or about 0.01 wt % to about 2 wt %; or about 0.01 wt % to about 1 wt %. These prevent the formation of air inclusions and pinholes in the cured coating. These also reduce rectified diffusion, which can cause reliability issues in the print head. Examples include the following products available from Evonik: TEGO AIREX 900, 910, 916, 920, 931, 936, 940, 944, 945, 950, 962, 980, and 986.

The ink compositions of the present invention may optionally contain one or more colorants, including pigments and/or dyes. When used, colorants such as yellow, magenta, cyan, black, orange, purple, green, etc. are typically present in an amount of about 0.1 wt % to about 5 wt %, based on the total weight of the ink or coating composition. For example, the colorants may be present in an amount of about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %. White colorants, such as titanium dioxide, are typically present in an amount of about 10 wt % to about 30 wt %, based on the total weight of the ink or coating composition. For example, white colorants may be present in an amount of about 10 wt % to about 25 wt %; or about 10 wt % to about 20 wt %; or about 10 wt % to about 15 wt %; or about 15 wt % to about 30 wt %; or about 15 wt % to about 25 wt %; or about 15 wt % to about 20 wt %. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are preferably milled to typically less than 1 micrometer, with a preferred particle size distribution of 10-500 nm. Preferably, the average particle size distribution is 10-350 nm, to have better transparency and a wide color gamut.

In order to incorporate the above-described pigments to the compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not strictly limited as long as the resin dispersant is equal to or more than the neutralization equivalent.

Examples of these surfactants used for the pigment dispersion include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

EXAMPLES

The following examples illustrate specific aspects of the present invention and are not intended to limit the scope thereof in any respect and should not be so construed.

Example 1

Cyan Inkjet Inks 1A to 1C Containing Polyvinylpyrrolidone

Comparative cyan inkjet inks containing polyvinylpyrrolidone (PVP) as a rheology modifier were prepared according to the formulations shown in Table 1. A reference ink not containing a rheology modifier is also shown.

TABLE 1

Cyan inkjet inks 1A to 1C

| Material | Source/commercial code | Reference | 1A | 1B | 1C |
| --- | --- | --- | --- | --- | --- |
| UV crosslinkable aqueous polyurethane dispersion | Allnex, IRR813 | 22.6 | 22.6 | 22.6 | 22.6 |
| Deionised water | | 48.45 | 43.45 | 43.45 | 48.25 |
| Solvent | Fisher Scientific, propylene glycol | 15 | 15 | 15 | 15 |
| Cyan dispersion | Sun Chemical proprietary | 12.5 | 12.5 | 12.5 | 12.5 |
| Photoinitiator | Irgacure 2959 ex BASF | 1.0 | 1.0 | 1.0 | 1.0 |
| Amine synergist | Fisher scientific, Triethanolamine | 0.2 | 0.2 | 0.2 | 0.2 |

TABLE 1-continued

Cyan inkjet inks 1A to 1C

| Material | Source/commercial code | Reference | 1A | 1B | 1C |
| --- | --- | --- | --- | --- | --- |
| Biocide | CHEMLINK SPECIALITIES, Nipacide B1 | 0.1 | 0.1 | 0.1 | 0.1 |
| Surfactant | Alpha Chemicals, Capstone FS-3100 | 0.15 | 0.15 | 0.15 | 0.15 |
| Polyvinylpyrrolidone | PVP K-10 ex Ashland | | 5.0 | | |
| Polyvinylpyrrolidone | PVP K-15 ex Ashland | | | 5.0 | |
| Polyvinylpyrrolidone | PVP K-90 ex Ashland | | | | 0.2 |
| Total | | 100 | 100 | 100 | 100 |
| Viscosity at 32° C. (mPas) | | 2.91 | 4.41 | 4.92 | 4.17 |

Ink viscosity was recorded using a Brookfield DVII viscometer at a temperature of 32° C. Unless otherwise stated, this method has been used throughout the application.

The inks in Table 1 were printed onto a coated Lenetta chart using a 10 micron K bar from RK and dried using a hot air blower for 15 seconds to remove all the solvent and give a dry, tack-free film. This ink film was then cured using a standard medium pressure mercury arc lamp at a dose of 150 mJ/cm$^2$. The resistance of the cured ink was then assessed by a solvent rub test using a Satra Stm421 rub tester with the pad soaked in deionised water. The test involves the rub tester moving the sample stage back and forth and the number of rubs recorded when the sample is showing multiple defects across the entire sample. Results are shown in Table 2 as an average of 2 runs.

TABLE 2

Rub resistance results of inks 1A to 1C

| Example | Water rub resistance |
| --- | --- |
| Reference | >200 |
| 1A | 19 |
| 1B | 18 |
| 1C | >200 |

All four formulations in Table 1 were also jetted onto an absorbent paper substrate using a Kyocera MH5420 (Gen5S), GH2220 from Kyocera Fineceramics, Frimley, Surrey, GU16 7ER at 32° C. Formulations 1A and 1B jetted reasonably well, but all had slight start-up issues and were inferior to the reference ink. Formulation C did not jet at all, failing to eject any ink from the nozzles.

When testing an inkjet ink, one of the key behaviour requirements is for the inkjet nozzles to be able to sit idle for a period of several minutes and then to be started again and show no loss of performance in terms of individual drops being actuated by the printhead, but not delivered to the substrate. This can be a consequence of things like solvent loss causing partial drying in the nozzles, or complex rheological characteristics. These behaviours tend to be grouped under their symptom banner of "poor startup".

In a commercial situation when printheads are not used for a period of a few minutes they tend to be capped and purged before use to re-establish optimum printing characteristics. Startup performance is typically tested in the laboratory by purging and then wiping the printheads and then waiting for a series of time intervals before printing a test pattern with a solid block of ink using ink from all nozzles. Perfect behaviour is defined as no "lost" nozzles, with a sharp continuous start line. Poor startup is defined by a feathering of this start line which would also then typically get worse with increasing wait periods. This level of poor startup can typically be corrected using approaches such as the application of a "tickle pulse" or the use of a "spit" function. In more extreme cases there is a loss of large parts of the image which may extend to several centimetres of lost print. In very severe cases no ink is printed from the test image until the head is again purged, the faceplate wiped, and printing commenced without delay.

The results from the jetting experiments and in Table 2 demonstrate that use of a water-soluble polymer such as polyvinylpyrrolidone, which would be well known to those skilled in the art as a potential route to increasing viscosity of a water-based ink formulation, is problematic, as even at the relatively low level of 5% it can cause significant disruption to the UV curing characteristics of water-based UV inkjet inks. In addition, the polymer causes inferior jetting characteristics, particularly with high molecular weight samples of polymer (PVP K-90). These difficulties highlight the need for a solution which can increase the viscosity of a water-based UV ink at a low addition level without adversely affecting either the jetting characteristics or the mechanical properties exhibited by the ink after cure.

Example 2

Cyan Inkjet Inks 2A to 2C Containing Polyethylene/Polypropylene Glycol Copolymer Cyan inkjet inks 2A to 2C containing polyethylene/polypropylene glycol copolymer as a thickening agent were prepared according to the formulations shown in Table 3. A reference ink not containing a thickening agent is also shown.

TABLE 3

Cyan inkjet inks 2A to 2C

| Material | Source/commercial code | Reference cyan | 2A | 2B | 2C |
|---|---|---|---|---|---|
| UV crosslinkable aqueous polyurethane dispersion | Allnex, IRR813 | 22.6 | 22.6 | 22.6 | 22.6 |
| Deionised water | | 48.45 | 43.45 | 43.45 | 43.45 |
| Solvent | Fisher Scientific, propylene glycol | 15 | 15 | 15 | 15 |
| Cyan dispersion | Sun Chemical proprietary | 12.5 | 12.5 | 12.5 | 12.5 |
| Photoinitiator | Irgacure 2959 ex BASF | 1.0 | 1.0 | 1.0 | 1.0 |
| Amine synergist | Fisher scientific, Triethanolamine | 0.2 | 0.2 | 0.2 | 0.2 |
| Biocide | CHEMLINK SPECIALITIES, Nipacide B1 | 0.1 | 0.1 | 0.1 | 0.1 |
| Surfactant | Alpha Chemicals, Capstone FS-3100 | 0.15 | 0.15 | 0.15 | 0.15 |
| Polyethylene/polypropylene glycol block copolymer | Pluronic RPE 1740 ex BASF | | 5.0 | | |
| Polyethylene/polypropylene glycol block copolymer | Pluronic PE 6400 ex BASF | | | 5.0 | |
| Polyethylene/polypropylene glycol block copolymer | Pluronic PE 10400 | | | | 5.0 |
| Total | | 100 | 100 | 100 | 100 |
| Viscosity at 32° C. (mPas) | | 3.24 | 4.77 | 4.38 | 5.13 |

The formulations in Table 3 were printed side by side with the reference cyan on a coated Lenetta chart using a 10 micron K bar from RK and dried using a hot air blower for 15 seconds to remove all the solvent and giving a dry, tack-free surface. This side-by-side printed sample was then cured using a standard medium pressure mercury arc lamp at a dose of 150 mJ/cm$^2$ and the comparative scratch resistance of the cured inks assessed using a Satra Stm421 rub tester with the foam pad replaced by an abrasive "Scotch" nylon cleaning pad. The print was loaded into the rub tester such that the abrasive pad travelled back and forth across the boundary of the two inks approximately 20 times to give a side by side comparison of the scratch resistance of both inks, described in Table 4.

TABLE 4

Scratch resistance results of inks 2A to 2C

| Example | Scratch resistance compared to reference cyan |
|---|---|
| 2A | Slightly worse |
| 2B | Significantly worse |
| 2C | Significantly worse |

The results in Table 4 indicate that the use of Pluronic type polyethylene/polypropylene glycol block copolymer additives to increase the ink viscosity will, at use levels required to give notable increases in ink viscosity cause a significant reduction in the performance properties of the water-based UV ink after cure. These difficulties highlight the need for a solution which can increase the viscosity of a water-based UV ink at a low addition level without adversely affecting either the jetting characteristics or the mechanical properties exhibited by the ink after cure. The application US 2010/0041816 describes the use of such materials in water-based inkjet inks where the use was successful. However, in contrast to UV cured and UV cured water based inkjet inks, there is little expectation of good resistance properties when using water-based inks.

Example 3

Yellow, Magenta, Cyan, and Black Inkjet Inks 3A to 3D Containing Synthetic Rheology Modifiers Water-based, UV curable yellow, magenta, cyan, and black inkjet inks (3A to 3D) containing synthetic rheology modifiers were formulated as shown in Table 5. Also shown is a comparative cyan ink.

TABLE 5

Inks 3A to 3D

| Material | Source/commercial code | Comp. cyan | 3A Yellow | 3B Magenta | 3C Cyan | 3D Black |
|---|---|---|---|---|---|---|
| UV crosslinkable aqueous polyurethane dispersion | Allnex, IRR813 | 22.6 | 22.6 | 22.6 | 22.6 | 22.6 |
| Deionised water | | 48.45 | 47.3 | 47.3 | 46.3 | 47.3 |
| Solvent | Fisher Scientific, propylene glycol | 15 | 15 | 15 | 15 | 15 |
| Yellow pigment dispersion | Sun Chemical proprietary | | 12.5 | | | |

TABLE 5-continued

Inks 3A to 3D

| Material | Source/ commercial code | Comp. cyan | 3A Yellow | 3B Magenta | 3C Cyan | 3D Black |
|---|---|---|---|---|---|---|
| Magenta pigment dispersion | SunChemical proprietary | | | 12.5 | | |
| Cyan pigment dispersion | SunChemical proprietary | 12.5 | | | 12.5 | |
| Black pigment dispersion | DIC proprietary | | | | | 12.5 |
| Photoinitiator | Irgacure 2959 ex BASF | 1.0 | 1.0 | 1.0 | 1.0 | 1.0 |
| Amine synergist | Fisher scientific, Triethanolamine | 0.2 | 0.2 | 0.2 | 0.2 | 0.2 |
| Biocide | CHEMLINK SPECIALITIES, Nipacide B1 | 0.1 | 0.1 | 0.1 | 0.1 | 0.1 |
| Surfactant | Alpha Chemicals, Capstone FS-3100 | 0.15 | 0.3 | 0.3 | 0.3 | 0.3 |
| Hydrophobically modified urethane | ACRYSOL SCT-275 ex Rohm & Haas* | | 1.0 | 1.0 | 2.0 | 1.0 |
| Total | | 100 | 100 | 100 | 100 | 100 |
| Viscosity at 32° C. (mPas) | | 2.91 | 13.9 | 14.5 | 15.0 | 14.1 |

*ACRYSOL SCT-275 is supplied as a 17.5% solids hydrophobically modified urethane in a mixture of diethylene glycol monobutyl ether and water (25/75)

The results in Table 5 demonstrate that it is possible to make yellow, magenta, cyan and black water-based UV inkjet inks with substantially increased viscosity based on the addition of extremely low levels of a hydrophobically modified urethane (HEUR) synthetic thickener.

Example 4

Cyan Inkjet Inks 4A to 4F Containing Synthetic Thickeners

Water-based UV curable cyan inkjet inks 4A to 4F, containing commercially available synthetic thickeners, were prepared according to the formulations shown in Table 6. A comparative cyan ink not containing synthetic thickeners is also shown.

TABLE 6

Inks 4A to 4F

| Material | Source/ commercial code | Comp. cyan | Examples | | | | | |
|---|---|---|---|---|---|---|---|---|
| | | | 4 A | 4 B | 4 C | 4 D | 4 E | 4 F |
| UV crosslinkable aqueous polyurethane dispersion | Allnex, IRR813 | 22.6 | 22.6 | 22.6 | 22.6 | 22.6 | 22.6 | 22.6 |
| Deionised water | | 48.55 | 46.75 | 47.55 | 47.55 | 47.55 | 47.55 | 47.55 |
| Solvent | Fisher Scientific, propylene glycol | 15 | 15 | 15 | 15 | 15 | 15 | 15 |
| Cyan pigment dispersion | SunChemical proprietary | 12.5 | 12.5 | 12.5 | 12.5 | 12.5 | 12.5 | 12.5 |
| Photoinitiator | Irgacure 2959 ex BASF | 1.0 | 1.0 | 1.0 | 1.0 | 1.0 | 1.0 | 1.0 |
| Amine synergist | Fisher scientific, Triethanolamine | 0.2 | 0.2 | 0.2 | 0.2 | 0.2 | 0.2 | 0.2 |
| Surfactant | Alpha Chemicals, Capstone FS-3100 | 0.15 | 0.15 | 0.15 | 0.15 | 0.15 | 0.15 | 0.15 |
| Hydrophobically modified polyether | [1]Rheovis PE1320 ex BASF | | 1.8 | | | | | |
| Hydrophobically modified polyurethane | [2]Rheovis PU1331 ex BASF | | | 1.0 | | | | |
| Hydrophobically modified urethane | ACRYSOL SCT-275 ex Rohm & Haas | | | | 1.0 | | | |
| Hydrophobically modified urethane | [3]ACRYSOL RM995 ex Rohm & Haas | | | | | 1.0 | | |

TABLE 6-continued

| | | Inks 4A to 4F | | | | | | |
|---|---|---|---|---|---|---|---|---|
| Material | Source/ commercial code | Comp. cyan | 4 A | 4 B | 4 C | 4 D | 4 E | 4 F |
| Hydrophobically modified polyether | [4]Rheovis PE1330 ex BASF | | | | | | 1.0 | |
| Hydrophobically modified polyurethane | [5]Rheovis PU1331 ex BASF | | | | | | | 1.0 |
| Total | | 100 | 100 | 100 | 100 | 100 | 100 | 100 |

[1]Rheovis PE1320 ex. BASF a 30% solution of Polyether in water/butoxytriglycol;
[2]Rheovis PU1331 ex. BASF a 18% solution of polyurethane in water;
[3]Acrysol RM995 ex. Dow a 23.5% solution of hydrophobically modified urethane in water;
[4]Rheovis PE1330 ex. BASF a 30% solution of polyether solution in water;
[5]Rheovis PU1191 ex. BASF a 30% solution of a polyurethane in water/diluent All the inks in Table 6 were measured for their viscosity at shear rates of 1 $S^{-1}$ and 700 $S^{-1}$ using a TA Instruments AR-G2 Rheometer fitted with a standard DIN concentric cylinder measuring system in a stepped flow experiment between 0.1 and 1000 $S^{-1}$ at 32° C. These results are shown in Table 7.

TABLE 7

Viscosity results of inks 4A to 4F

| Example | Viscosity at 1 $S^{-1}$ mPas | Viscosity at 700 $S^{-1}$ mPas |
|---|---|---|
| Comp. cyan | 2.9 | 3.8* |
| 4A | 8.8 | 9.3 |
| 4B | 4.7 | 5.3 |
| 4C | 5.2 | 5.9 |
| 4D | 4.7 | 5.1 |
| 4E | 4.3 | 5.0 |
| 4F | 7.3 | 7.0 |

*Measured at 400 $S^{-1}$ because the lower viscosity has introduced turbulent flow above this shear rate causing the viscosity to apparently rise significantly The results in Table 7 demonstrate that it is possible to make water-based UV curing inkjet inks having slightly elevated viscosities but with Newtonian flow characteristics through the use of various HEUR and HMPE type synthetic thickeners at very low addition levels. This is surprising in view of the fact that EP1464686B1 describes the use of HASE and HEUR type synthetic thickeners in water-based inks that impart a viscosity of 10,000-12,000 at a shear rate of 1 $S^{-1}$ and 20-40 mPas at a shear rate of 1000 $S^{-1}$ i.e. these inks are extremely pseudoplastic in behaviour whereas the inks of the present invention are essentially Newtonian over 4 decades of shear rate. Additionally, WO 2011/079402 describes inkjet inks which are preferably shear thinning in character, with this property imparted through the use of a HEUR synthetic thickener.

Example 5

Cyan Inkjet Inks 5A and 5B Containing Synthetic Thickeners

Water-based UV curable inkjet inks 5A and 5B, containing commercially available synthetic thickeners were prepared according to the formulations in Table 8. A comparative cyan ink, not containing synthetic thickeners, is also shown.

TABLE 8

| | Inks 5A and 5B | | | |
|---|---|---|---|---|
| Material | Source/commercial code | Comp. cyan | 5A | 5B |
| UV crosslinkable aqueous polyurethane dispersion | Allnex, IRR813 | 22.6 | 22.6 | 22.6 |
| Deionised water | | 48.45 | 47.65 | 47.65 |
| Solvent | Fisher Scientific, propylene glycol | 15 | 15 | 15 |
| Cyan pigment dispersion | SunChemical proprietary | 12.5 | 12.5 | 12.5 |
| Photoinitiator | Irgacure 2959 ex BASF | 1.0 | 1.0 | 1.0 |
| Amine synergist | Fisher scientific, Triethanolamine | 0.2 | 0.2 | 0.2 |
| Surfactant | Alpha Chemicals, Capstone FS-3100 | 0.15 | 0.15 | 0.15 |
| Biocide | CHEMLINK SPECIALITIES, Nipacide B1 | 0.1 | 0.1 | 0.1 |
| Hydrophobically modified polyether | Rheovis PE1330 ex BASF | | 0.8 | |
| Hydrophobically modified polyurethane | Rheovis PU1331 ex BASF | | | 0.8 |
| Total | | 100 | 100 | 100 |
| Viscosity at 32° C. (mPas) | | 2.91 | 3.84 | 3.87 |

The inks in Table 8 were printed onto a coated Lenetta chart using a 10 micron K bar from RK and dried using a hot air blower for 15 seconds to remove all the solvent and giving a dry, tack-free film. This ink film was then cured using a standard medium pressure mercury arc lamp at a dose of 150 mJ/cm². The resistance of the cured ink was then assessed by a solvent rub test using a Satra Stm421 rub tester with the pad soaked in deionised water. The test involves the rub tester moving the sample stage back and forth and the number of rubs recorded when the sample is showing multiple defects across the entire sample. Results are shown in Table 9 as an average of 2 runs.

TABLE 9

Rub resistance results of inks 5A and 5B

| Example | Water rub resistance |
|---|---|
| Comp. cyan | >200 |
| 5A | >200 |
| 5B | >200 |

All three formulations in Table 8 were jetted onto an absorbent paper substrate using a Kyocera MH5420 (Gen5S), GH2220 from Kyocera Fineceramics, Frimley, Surrey, GU16 7ER at 32° C. Formulations 5A and 5B both jetted reasonably, although 5B was not quite as good on start-up as 5A. Formulation A was only marginally inferior to the comparative cyan standard and would be within the region where those skilled in the art could adjust the print-head settings to achieve an acceptable result. When combined with the good rub resistance results shown in Table 9, this demonstrates that it is possible to produce water-based UV curing inkjet inks containing non-ionic associative thickeners that give acceptable resistance properties and jetting performance.

Example 6

Cyan Inkjet Inks 6A and 6B Containing Hydrophobically Modified Polyether

Water-based UV curable inkjet inks 6A and 6B, containing hydrophobically modified polyether as a thickener, were prepared according to the formulations in Table 10. A comparative cyan ink is also shown.

only slightly inferior to the comparative cyan. Formulation B was not quite as good on start-up as 6A or the comparative cyan but as would be appreciated by those skilled in the art, this performed well considering its viscosity was significantly above the optimum jetting viscosity for this print head of 4-5 mPas.

The formulations 6A and 6B were both printed side by side with the comparative cyan on a coated Lenetta chart using a 10 micron K bar from RK and dried using a hot air blower for 15 seconds to remove all the solvent and giving a dry, tack-free surface. This side-by-side printed sample was then cured using a standard medium pressure mercury arc lamp at a dose of 150 mJ/cm². The comparative scratch resistance of the cured inks was then assessed using a Satra Stm421 rub tester with the foam pad replaced by an abrasive "Scotch" nylon cleaning pad. The print was loaded into the rub tester such that the abrasive pad travelled back and forth across the boundary of the two inks and gave a side by side comparison of the scratch resistance of both inks. This process was repeated at a lower cure dose of 50 mJ/cm² and the results shown in Table 11.

TABLE 11

Scratch resistance results of inks 6A and 6B

| Example | Cure Dose/ mJ | Number of rub cycles | Scratch resistance compared to comparative cyan |
|---|---|---|---|
| 6A | 150 | 30 | equivalent |
| 6B | 150 | 32 | equivalent |
| 6A | 50 | 18 | equivalent |
| 6B | 50 | 16 | equivalent |

The results in Table 11 indicate that the inks of the present invention using the HMPE synthetic thickener Rheovis PE 1320 allows the viscosity of a formulation to be increased significantly without affecting its subsequent scratch resistance properties after UV cure.

The inks in Table 10 were printed onto a coated Lenetta chart using a 10 micron K bar from RK and dried using a hot air blower for 15 seconds to remove all the solvent and giving a dry, tack-free film. This ink film was then cured using a standard medium pressure mercury arc lamp at doses of 150, 80 and 50 mJ/cm². The resistance of the cured ink

TABLE 10

Inks 6A and 6B

| Material | Source/commercial code | Comp. cyan | 6A | 6B |
|---|---|---|---|---|
| UV crosslinkable aqueous polyurethane dispersion | Allnex, IRR813 | 22.6 | 22.6 | 22.6 |
| Deionised water |  | 48.55 | 47.72 | 46.88 |
| Solvent | Fisher Scientific, propylene glycol | 15 | 15 | 15 |
| Cyan pigment dispersion | SunChemical proprietary | 12.5 | 12.5 | 12.5 |
| Photoinitiator | Irgacure 2959 ex BASF | 1.0 | 1.0 | 1.0 |
| Amine synergist | Fisher scientific, Triethanolamine | 0.2 | 0.2 | 0.2 |
| Surfactant | Alpha Chemicals, Capstone FS-3100 | 0.15 | 0.15 | 0.15 |
| Hydrophobically modified polyether | Rheovis PE 1320 ex BASF |  | 0.83 | 1.67 |
| Total |  | 100 | 100 | 100 |
| Viscosity at 32° C. (mPas) |  | 3.27 | 5.94 | 8.76 |

The formulations in Table 10 were jetted onto an absorbent paper substrate using a Kyocera MH5420 (Gen5S), GH2220 from Kyocera Fineceramics, Frimley, Surrey, GU16 7ER at 32° C. Formulation 6A jetted well and was was then assessed by a solvent rub test using a Satra Stm421 rub tester with the pad soaked in deionised water. The test involves the rub tester moving the sample stage back and forth and the number of rubs recorded when the sample is showing multiple defects across the entire sample. Results are shown in Table 12 as an average of 2 runs.

TABLE 12

Rub resistance results of 6A and 6B

| | Water rub resistance | | |
|---|---|---|---|
| Example | 150 mJ | 80 mJ | 50 mJ |
| Comparative cyan | >200 | >200 | >200 |
| 6A | >200 | >200 | >200 |
| 6B | >200 | >200 | >200 |

The results in Table 12 indicate that the inks of the present invention using the HMPE synthetic thickener Rheovis PE 1320 allows the viscosity of an inkjet formulation to be increased significantly without affecting its subsequent water/rub resistance properties after UV cure.

Example 7

Cyan Inkjet Ink 7A Containing Hydrophobically Modified Polyether

Water-based UV curable cyan inkjet ink 7A, containing a hydrophobically modified polyether as a thickener, was prepared according to the formulation in Table 13. Three comparative inks, Comp. A, B, and C, were also prepared.

TABLE 13

| | Ink 7A | | | | |
|---|---|---|---|---|---|
| Material | Source/commercial code | Comp. A | Comp. B | Comp. C | 7A |
| UV crosslinkable aqueous polyurethane dispersion | Allnex, IRR813 | 22.6 | 25 | 22.6 | 22.6 |
| Deionised water | | 48.55 | 26 | 45.05 | 46.75 |
| Solvent | Fisher Scientific, propylene glycol | 15 | 32.5 | 15 | 15 |
| Cyan pigment dispersion | SunChemical proprietary | 12.5 | 12.5 | 12.5 | 12.5 |
| Photoinitiator | Irgacure 2959 ex BASF | 1.0 | 1.0 | 1.0 | 1.0 |
| Amine synergist | Fisher scientific, Triethanolamine | 0.2 | 0.2 | 0.2 | 0.2 |
| Surfactant | Alpha Chemicals, Capstone FS-3100 | 0.15 | 0.2 | 0.15 | 0.15 |
| Biocide | CHEMLINK SPECIALITIES, Nipacide B1 | | 0.1 | | |
| | Trimethylolpropane ex Akcros organics | | 2.5 | | |
| Hydrophobically modified polyether | Rheovis PE1320 ex BASF | | | | 1.8 |
| Polyethylene/polypropylene glycol block copolymer | Pluronic PE 6800 ex BASF | | | 3.5 | |
| Total | | 100 | 100 | 100 | 100 |
| Viscosity at 32° C. (mPas) | | 3.06 | 7.35 | 8.16 | 8.13 |

Ink 7A in Table 13 was printed side-by-side with the comparative cyans (Comp. A, B and C) on a coated Lenetta chart using a 10 micron K bar from RK, and dried using a hot air blower for sufficient time to remove all the solvent and giving a dry, tack-free surface. These side-by-side printed samples were then cured using a standard medium pressure mercury arc lamp at a dose of 150 mJ/cm². The comparative scratch resistance of the cured inks was then assessed using a Satra Stm421 rub tester with the foam pad replaced by an abrasive "Scotch" nylon cleaning pad. The print was loaded into the rub tester such that the abrasive pad travelled back and forth across the boundary of the two inks and gave a side-by-side comparison of the scratch resistance of both inks.

TABLE 14

Scratch resistance results of ink 7A

| Example | Reference ink | Number of rub cycles | Scratch resistance of 7A compared to comparative cyan |
|---|---|---|---|
| 7A | Comp A | 36 | equivalent |
| 7A | Comp B | 36 | equivalent |
| 7A | Comp C | 36 | significantly superior |

The inks in Table 13 were printed onto a coated Lenetta chart using a 10 micron K bar from RK and dried using a hot air blower for sufficient time to remove all the solvent and giving a dry, tack-free film. This ink film was then cured using a standard medium pressure mercury arc lamp at doses of 100, 70 and 50 mJ/cm². The resistance of the cured ink was then assessed by a solvent rub test using a Satra Stm421 rub tester with the pad soaked in deionised water. The test involves the rub tester moving the sample stage back and forth and the number of rubs recorded when the sample was showing multiple defects across the entire sample. Results are shown in Table 15 as an average of 2 runs.

TABLE 15

Rub resistance results of ink 7A

| | Water rub resistance | | |
|---|---|---|---|
| Example | 100 mJ | 70 mJ | 50 mJ |
| Comp. A | >200 | >200 | >200 |
| Comp. B | >200 | >200 | >200 |
| Comp. C | >200 | >200 | >200 |
| 7A | >200 | >200 | >200 |

The inks in Table 13 were printed onto coated Lenetta charts using a 10 m K bar from RK and dried using a hot air blower, measuring the approximate amount of time required to remove all of the solvent and giving a dry, tack free film. Results are shown in Table 16.

TABLE 16

Drying time results

| Example | Approximate drying time (seconds) |
|---|---|
| Comp. A | 15 |
| Comp. B | 30 |
| Comp. C | NA[1] |
| 7A | 15 |

[1]Cannot be determined as the Pluronic PE 6800 makes the ink tacky even after all of the solvent has been removed. This tackiness disappears on UV curing.

The results in Tables 14, 15 and 16 together indicate that the inks of the present invention using the HMPE synthetic thickener Rheovis PE 1320 allows the viscosity of a formulation to be increased significantly without affecting its drying properties and subsequent cure and scratch resistance properties after UV cure. In contrast, Comp. A has good properties, but at 3.06 mPas has a viscosity which is far too low to be used with most print heads; Comp. B can achieve the viscosity and resistance properties but severely compromises the drying performance; and Comp. C can achieve the necessary ink viscosity but the scratch resistance properties after drying are significantly compromised. It is only through the use of a synthetic thickener as described in this invention that the viscosity, drying performance and solvent/scratch resistance properties can be achieved together.

Ink 7A in Table 13 was printed using a QSR print head (FUJIFILM Dimatix) at room temperature driven using GIS Gen4 Electronics (Global Inkjet Systems, Cambridge, UK) and JetXpert (New Hampshire, USA) drop analysis software. This ink gave generally good jetting characteristics, although the start-up was slow. Application of a "tickle pulse" significantly improved the start-up, and it is well-known by those skilled in the art that this and a number of other strategies are available which can improve start-up further. Thus, good utility of the invention has been demonstrated. It would also be well known by those skilled in the art that the comparative ink without synthetic thickener (Comp. A) could not be effectively jetted using this print head because of its very low viscosity, causing drop formation and jetting reliability issues.

Example 8

Cyan Inkjet Ink 8A Containing Hydrophobically Modified Polyether

A water-based UV curable inkjet ink, 8A, was prepared according to the formulation in Table 17.

TABLE 17

Ink 8A

| Material | Source/commercial code | 8A |
|---|---|---|
| UV crosslinkable aqueous polyurethane dispersion | Allnex, IRR813 | 22.6 |
| Deionised water | | 46.55 |
| Solvent | Fisher Scientific, propylene glycol | 15 |
| Cyan pigment dispersion | SunChemical proprietary | 12.5 |
| Photoinitiator | Irgacure 2959 ex BASF | 1.0 |
| Amine synergist | Fisher scientific, Triethanolamine | 0.2 |
| Surfactant | Alpha Chemicals, Capstone FS-3100 | 0.15 |

TABLE 17-continued

Ink 8A

| Material | Source/commercial code | 8A |
|---|---|---|
| Biocide | CHEMLINK SPECIALITIES, Nipacide B1 | |
| | Trimethylolpropane ex Akcros organics | |
| Hydrophobically modified polyether | Rheovis PE1320 ex BASF | 2.0 |
| Total | | 100 |
| Viscosity at 32° C. (mPas) | | 9.69 |

Ink 8A in Table 17 was printed using a Ricoh GH 2220 head at room temperature driven using GIS Gen4 Electronics (Global Inkjet Systems, Cambridge, UK) and JetXpert (New Hampshire, USA) drop analysis software. This ink gave generally good jetting characteristics, although the start-up was poor. Application of a "tickle pulse" significantly improved the start-up, and it is well-known by those skilled in the art that this and a number of other strategies are available which can improve start-up further. So, good utility of the invention has been demonstrated.

Example 9

Cyan Inkjet Ink 9A Containing Hydrophobically Modified Polyether

Water-based UV curable inkjet ink 9A was prepared according to the formulation in Table 18.

TABLE 18

Ink 9A

| Material | Source/commercial code | 9A |
|---|---|---|
| UV crosslinkable aqueous polyurethane dispersion | Allnex, IRR813 | 24.75 |
| Deionised water | | 25.74 |
| Solvent | Fisher Scientific, propylene glycol | 32.126 |
| Trimethylolpropane | Sigma-Aldrich | 2.475 |
| Cyan pigment dispersion | SunChemical proprietary | 12.375 |
| Photoinitiator | Irgacure 2959 ex BASF | 0.99 |
| Amine synergist | Fisher scientific, Triethanolamine | 0.198 |
| Surfactant | Alpha Chemicals, Capstone FS-3100 | 0.198 |
| Biocide | Acticide MBS ex Munzing | 0.099 |
| Antifoam | Agitan 120 ex Munzing | 0.049 |
| Hydrophobically modified polyether | Rheovis PE1330 ex BASF | 1 |
| Total | | 100 |
| Viscosity at 32° C. (mPas) | | 9.00 |

The ink in Table 18 was jetted using a Xaar 1002 printhead mounted onto a Griffin Technology Evaluation Rig and a Jet Expert visualisation system. This was jetted using either a syringe fill method, or with a recirculation pump in place to give a high recirculation rate in the printhead.

When using the static syringe fill method ink 9A showed very poor start-up behaviour as observed in the previously described examples 3, 4 and 5, although in this case the startup issues were more severe. This extent of startup failure is not something that could easily be rectified using approaches such as the application of a tickle pulse. However, when used in a recirculation mode there was no evidence of any start-up issues and indicates that start-up issues were a consequence of a laboratory printhead setup and would not be problematic in a commercial printhead with a recirculation system.

Example 10

Cyan Inkjet Inks 10A to 10E Containing Synthetic Thickeners

Water-based UV curable inkjet inks 10A to 10E were prepared according to the formulations in Table 19.

TABLE 19

Inks 10A to 10E

| Material | Source/ commercial code | 10A | 10B | 10C | 10D | 10E |
|---|---|---|---|---|---|---|
| UV crosslinkable aqueous polyurethane dispersion | Allnex, IRR813 | 25 | 25 | 25 | 25 | 25 |
| Deionised water | | 45.4 | 45.2 | 45.3 | 44.0 | 44.8 |
| Solvent | Fisher Scientific, propylene glycol | 15 | 15 | 15 | 15 | 15 |
| Cyan Pigment dispersion | SunChemical proprietary | 12.5 | 12.5 | 12.5 | 12.5 | 12.5 |
| Photoinitiator | Irgacure 2959 ex BASF | 1 | 1 | 1 | 1 | 1 |
| Amine synergist | Fisher scientific, Triethanolamine | 0.2 | 0.2 | 0.2 | 0.2 | 0.2 |
| Surfactant | Alpha Chemicals, Capstone FS-3100 | 0.2 | 0.2 | 0.2 | 0.2 | 0.2 |
| Hydrophobically modified alkali swellable emulsion (HASE) | Aculyn 22 ex DOW | 0.7 | | | | |
| Alkali swellable emulsion (ASE) | Aculyn 38 ex DOW | | 0.9 | | | |
| Hydrophobically modified polyurethane (HEUR) | Rheolate FX1080 ex Elementis | | | | 2.1 | |
| Hydrophobically modified polyurethane (HEUR) | Aculyn 44 ex DOW | | | 0.8 | | |
| Hydrophobically modified polyurethane (HEUR) | Additol VXW6360 ex ALLNEX | | | | | 1.3 |
| Total | | 100 | 100 | 100 | 100 | 100 |
| Viscosity at 32° C. (mPas) | | 11.5 | 6.93 | 6.75 | 6.21 | 6.06 |

The inks in Table 19 were jetted onto an absorbent paper substrate using a Kyocera MH5420 (Gen5S), GH2220 from Kyocera Fineceramics, Frimley, Surrey, GU16 7ER at 32° C. The performance of the inks on startup was assessed, and the results are shown in Table 20.

TABLE 20

Startup characteristics on jetting of inks 10A to 10E

| | Comments on startup after | |
|---|---|---|
| Example | 30 seconds | 120 seconds |
| 10A | slight feathering | significant feathering and 0.5 cm lost image |
| 10B | very slight feathering | very slight feathering |
| 10C | 2-3 cm of lost image | all image lost, no print |
| 10D | 2-3 cm of lost image | almost all image lost |
| 10E | 2-3 cm of lost image | all image lost, no print |

These results demonstrate that whilst HEUR type materials are effective at low addition levels, as demonstrated in earlier examples, they start to start to show very poor startup behaviour at the levels necessary to give viscosities of 6-8 (mPas) at 32° C. In contrast, HASE and ASE type thickeners perform much better at these higher levels, giving only slightly diminished performance, that can be readily overcome by the use of strategies such as tickle pulses.

Example 11

Magenta Inkjet Inks 11A to 11E Containing Synthetic Thickeners

Water-based UV curable magenta inkjet inks 11A to 11E were prepared according to the formulations in Table 21.

TABLE 21

Inks 11A to 11E

| Material | Source/commercial code | 11A | 11B | 11C | 11D | 11E |
|---|---|---|---|---|---|---|
| UV crosslinkable aqueous polyurethane dispersion | Allnex, IRR813 | 25 | 25 | 25 | 25 | 25 |
| Deionised water | | 43.15 | 42.65 | 43.05 | 42.95 | 42.65 |
| Solvent | Fisher Scientific, propylene glycol | 15 | 15 | 15 | 15 | 15 |
| Magenta Pigment dispersion | SunChemical proprietary | 15 | 15 | 15 | 15 | 15 |
| Photoinitiator | Irgacure 2959 ex BASF | 1 | 1 | 1 | 1 | 1 |
| Amine synergist | Fisher scientific, Triethanolamine | 0.2 | 0.2 | 0.2 | 0.2 | 0.2 |
| Surfactant | Alpha Chemicals, Capstone FS-3100 | 0.2 | 0.2 | 0.2 | 0.2 | 0.2 |
| Antifoam | Agitan 120 ex Munzing | 0.05 | 0.05 | 0.05 | 0.05 | 0.05 |
| Biocide | Acticide MBS ex Munzing | 0.1 | 0.1 | 0.1 | 0.1 | 0.1 |
| Hydrophobically modified alkali swellable emulsion (HASE) | Aculyn 22 ex DOW | 0.3 | | | | |
| Alkali swellable emulsion (ASE) | Aculyn 38 ex DOW | | 0.8 | | | |
| Hydrophobically modified polyurethane (HEUR) | Rheolate FX1080 ex Elementis | | | 0.5 | | |
| Hydrophobically modified polyurethane (HEUR) | Aculyn 44 ex DOW | | | | 0.4 | |
| Hydrophobically modified polyurethane (HEUR) | Additol VXW6360 ex ALLNEX | | | | | 0.8 |
| Total | | 100 | 100 | 100 | 100 | 100 |
| Viscosity at 32° C. (mPas) | | 6.84 | 8.49 | 7.68 | 5.22 | 7.71 |

The inks in Table 21 were jetted onto an absorbent paper substrate using a Kyocera MH5420 (Gen5S), GH2220 from Kyocera Fineceramics, Frimley, Surrey, GU16 7ER at 32° C.

TABLE 22

Startup characteristics on jetting of inks 11A to 11E

| | Comments on startup after | |
|---|---|---|
| Example | 30 seconds | 300 seconds |
| 11A | slight feathering | feathering |
| 11B | very slight feathering | very slight feathering |
| 11C | significant image loss across many nozzles | all image lost, no print (120 seconds) |
| 11D | 1 cm of lost image | all image lost, no print (120 seconds) |
| 11E | significant image loss across many nozzles | all image lost, no print (90 seconds) |

These results in Table 22 demonstrate a similar pattern to that shown with cyan inks containing higher levels of synthetic thickeners in Table 20, in that whilst HEUR type materials are effective at low addition levels, they start to start to show very poor startup behaviour at the levels necessary to give viscosities of 6-8 (mPas) at 32° C. In contrast, HASE and ASE type thickeners perform much better at these higher levels giving only slightly diminished performance, that can be readily overcome by the use of strategies such as tickle pulses.

Example 12

Different Colored Inkjet Inks Containing Alkali Swellable Emulsion

Yellow (12Y), magenta (12M), light magenta (12LM), cyan (12C), light cyan (12LC), and black (12K) water-based UV curable inkjet inks containing an alkali swellable emulsion as a thickener were prepared according to the formulations in Table 23.

TABLE 23

Example 12 different colored inks

| Material | Source/commercial code | 12Y | 12M | 12LM | 12C | 12LC | 12K |
|---|---|---|---|---|---|---|---|
| UV crosslinkable aqueous polyurethane dispersion | Allnex, IRR813 | 25 | 25 | 25 | 25 | 25 | 25 |

TABLE 23-continued

Example 12 different colored inks

| Material | Source/ commercial code | 12Y | 12M | 12LM | 12C | 12LC | 12K |
|---|---|---|---|---|---|---|---|
| Deionised water | | 44.55 | 42.35 | 54.88 | 44.55 | 55.25 | 43.05 |
| Solvent | Fisher Scientific, propylene glycol | 15 | 15 | 15 | 15 | 15 | 15 |
| Yellow Pigment dispersion | SunChemical proprietary | 12.5 | | | | | |
| Magenta Pigment dispersion | SunChemical proprietary | | 15 | 2.2 | | | |
| Cyan Pigment dispersion | SunChemical proprietary | | | | 12.5 | 1.7 | |
| Black Pigmenr Dispersion | SunChemical proprietary | | | | | | 0.14 |
| Photoinitiator | Irgacure 2959 ex BASF | 1 | 1 | 1 | 1 | 1 | 1 |
| Amine synergist | Fisher scientific, Triethanolamine | 0.2 | 0.2 | 0.2 | 0.2 | 0.2 | 0.2 |
| Surfactant | Alpha Chemicals, Capstone FS-3100 | 0.2 | 0.2 | 0.2 | 0.2 | 0.2 | 0.2 |
| Biocide | Acticide MBS ex Munzing | 0.1 | 0.1 | | 0.1 | 0.1 | 0.1 |
| Antifoam | Agitan 120 ex Munzing | 0.05 | 0.05 | | 0.05 | | 0.05 |
| alkali swellable emulsion (ASE) | Aculyn 38 ex DOW | 1.4 | 1.1 | 1.52 | 1.4 | 1.55 | 1.4 |
| Total | | 100 | 100 | 100 | 100 | 100 | 100 |
| Viscosity at 32° C. (mPas) | | 12.0 | 9.99 | 12.5 | 10.9 | 12.6 | 9.63 |

The inks in Table 23 were jetted onto an absorbent paper substrate using a Kyocera MH5420 (Gen5S), GH2220 from Kyocera Fineceramics, Frimley, Surrey, GU16 7ER at 32° C. The startup performance of the inks was assessed, and the results are shown in Table 24.

TABLE 24

Startup characteristics on jetting of Example 12 inks

| Example | Comments on startup after 30 seconds | 300 seconds |
|---|---|---|
| 12Y | very slight feathering | very slight feathering |
| 12M | slight feathering | very slight feathering |
| 12LM | feathering | feathering |
| 12C | significant feathering and 0.5 cm lost image | significant feathering |
| 12LC | feathering | slight feathering |
| 12K | significant feathering and 0.5 cm lost image | slight feathering |

These results in Table 24 demonstrate good utility of ASE type thickeners in all commonly used inkjet colours (yellow, magenta, cyan, black, light magenta and light cyan) to give viscosities of 9-13 (mPas) at 32° C., an increase of several hundred percent over a formulation containing no synthetic thickener. In particular, there is no significant further decline in startup performance with nozzle open times of up to 5 minutes, and the feathering effects on startup are within the capability of those skilled in the art to address using techniques such as the application of a tickle pulse.

Example 13

Cyan Inkjet Inks 13A to 13I Containing ASE and HASE Thickeners

Water-based UV curable inkjet ink bases were prepared according to the formulation detailed in Table 25. Inks 13A to 13I were prepared by adding the ASE or HASE thickeners to the Table 25 base, according to Table 26, and the balance of the ink formulations were made up to 100 parts using deionised water.

TABLE 25

Ink base formulation

| Material | Source/commercial code | % |
|---|---|---|
| UV crosslinkable aqueous polyurethane dispersion | Allnex, IRR813 | 25 |
| Solvent | Fisher Scientific, propylene glycol | 15 |
| Magenta pigment dispersion | SunChemical proprietary | 15 |
| Photoinitiator | Irgacure 2959 ex BASF | 1 |
| Amine synergist | Fisher scientific, Triethanolamine | 0.2 |
| Surfactant | Alpha Chemicals, Capstone FS-3100 | 0.2 |
| Biocide | CHEMLINK SPECIALITIES, Nipacide MBS | 0.1 |
| Anti-foam | Agitan 120 ex. Münzing | 0.05 |
| Total | | 56.55 |

TABLE 26

Inks 13A to 13I (ink base + ASE or HASE indicated)

| | Material | Source/commercial code | % used in formulation | Formulation Viscosity at 32° C. (mPas) |
|---|---|---|---|---|
| 13A | Alkali-swellable anionic acrylic polymer emulsion (ASE) | Aculyn 33 ex. Dow | 1.0 | 10.6 |
| 13B | Alkali-swellable anionic acrylic polymer emulsion (ASE) | Rheovis AS1125 ex. BASF | 1.1 | 10.9 |
| 13C | Alkali-swellable anionic acrylic polymer emulsion (ASE) | Rheovis AS1130 ex. BASF | 1.1 | 11.6 |
| 13D | Hydrophobically modified alkali-swellable anionic acrylic polymer emulsion (HASE) | Tafigel AP10 ex. Münzing | 0.6 | 9.84 |
| 13E | Hydrophobically modified alkali-swellable anionic acrylic polymer emulsion (HASE) | Tafigel AP10 ex. Münzing | 0.4 | 10.7 |
| 13F | Hydrophobically modified alkali-swellable anionic acrylic polymer emulsion (HASE) | Tafigel AP10 ex. Münzing | 0.5 | 10.3 |
| 13G | Hydrophobically modified alkali-swellable anionic acrylic polymer emulsion (HASE) | Texicryl 13-307 ex. Scott Bader Wellingborough Northamptonshire NN29 7RL | 1.1 | 10.6 |
| 13H | Hydrophobically modified alkali-swellable anionic acrylic polymer emulsion (HASE) | Texicryl 13-308 ex. Scott Bader Wellingborough Northamptonshire NN29 7RL | 1.1 | 9.96 |
| 13I | Hydrophobically modified alkali-swellable anionic acrylic polymer emulsion (HASE) | Texicryl 13-309 ex. Scott Bader Wellingborough Northamptonshire NN29 7RL | 0.8 | 10.2 |

Inks 13A to 13I were jetted onto an absorbent paper substrate using a Kyocera MH5420 (Gen5S), GH2220 from Kyocera Fineceramics, Frimley, Surrey, GU16 7ER at 32° C. The startup performance of the inks was assessed, and the results are shown in Table 27.

TABLE 27

Startup characteristics on jetting of inks 13A to 13I

| | Comments on startup after | |
|---|---|---|
| Example | 30 seconds | 300 seconds |
| 13A | significant feathering | significant feathering |
| 13B | significant feathering | significant feathering and 0.5 cm lost image |
| 13C | significant feathering and 0.5 cm lost image | significant feathering |
| 13D | significant feathering | significant feathering and 0.5 cm lost image |
| 13E | significant feathering | feathering |
| 13F | slight feathering | feathering |
| 13G | significant feathering | feathering |
| 13H | significant feathering and 1.0 cm lost image | feathering |
| 13I | significant feathering | slight feathering |

These results demonstrate good utility of ASE and HASE type thickeners from various different suppliers to give viscosities of 9-12 (mPas) at 32° C. in waterbased UV curing inkjet inks; an increase of several hundred percent over a formulation containing no synthetic thickener. In particular, there is no significant further decline in startup performance with nozzle open times of up to 5 minutes, and the feathering effects on startup are within the capability of those skilled in the art to address using techniques such as the application of a tickle pulse.

Example 14

Magenta Inkjet 14A Containing HASE

A magenta water-based UV curable inkjet ink, 14A, was prepared according to the formulation in Table 28.

TABLE 28

Ink 14A

| Material | Source/commercial code | 14A |
|---|---|---|
| UV crosslinkable aqueous polyurethane dispersion | Allnex, IRR813 | 25 |
| Deionised water | | 43.3 |
| Solvent | Fisher Scientific, propylene glycol | 15 |
| Magenta pigment dispersion | SunChemical proprietary | 15 |
| Photoinitiator | Irgacure 2959 ex BASF | 1 |
| Amine synergist | Fisher scientific, Triethanolamine | 0.2 |

TABLE 28-continued

Ink 14A

| Material | Source/commercial code | 14A |
|---|---|---|
| Surfactant | Alpha Chemicals, Capstone FS-3100 | 0.2 |
| Hydrophobically modified alkali-swellable anionic acrylic polymer emulsion (HASE) | Aculyn 22 ex. Dow | 0.3 |
| Total | | 100 |

The amine triethanoloamine was then post-added at various levels to 100 g of the ink to determine the sensitivity of the ink viscosity to changes in the pH. Results of this are given in Table 29.

TABLE 29

Effect of pH on the viscosity of ink 14A

| Material | Viscosity at 32° C. (mPas) | pH |
|---|---|---|
| 14A from table 28 | 6.69 | 7.96 |
| +0.2 g Triethanolamine | 7.14 | 8.29 |
| +0.4 g Triethanolamine | 7.35 | 8.49 |
| +0.6 g Triethanolamine | 7.41 | 8.56 |
| +1 g Triethanolamine | 8.25 | 9.11 |

The results the Table 29 indicate that although there is some change in viscosity as a function of pH from the triethanoloamine post-addition, this is still relatively small compared with the overall pH change. Certainly those skilled in the art would not have a problem in manufacturing such inks on an industrial basis within a typical viscosity specification range of +/−0.5 mPas as a consequence of the viscosity variations that come from varying the amine level. This observation appears to be indirect contradiction to the view expressed in WO 2009/104042 which describes that ASE and HASE type modifiers are problematic because of their tendency to cause viscosity drift as a consequence of minor pH changes.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A water-based energy curable inkjet ink or coating composition comprising:
    a) 0.1 wt % to 3 wt % one or more synthetic rheology modifiers;
    b) 15 wt % to 45 wt % one or more energy curable resins;
    c) 0.1 wt % to 4 wt % one or more tertiary amines; and
    d) 20 wt % to 80 wt % water;
wherein the water-based energy curable inkjet ink or coating composition has a pH of 7.0 to 9.5; and
wherein the ink or coating composition exhibits Newtonian characteristics.

2. The water-based energy curable inkjet ink or coating composition of claim 1, wherein the one or more synthetic rheology modifiers are present in an amount of 0.1 wt % to 2 wt %.

3. The water-based energy curable inkjet ink or coating composition of claim 1, wherein the one or more synthetic rheology modifiers are each independently selected from the group consisting of alkali swellable emulsions, hydrophobically modified alkali swellable emulsions, hydrophobically modified polyurethanes, hydrophobically modified polyethers, and hydrophobic ethoxylated aminoplasts.

4. The water-based energy curable inkjet ink or coating composition of claim 1, wherein the one or more energy curable resins are present in an amount of 15 wt % to 40 wt %.

5. The water-based energy curable inkjet ink or coating composition of claim 1, wherein the one or more energy curable resins is each independently selected from the group consisting of acrylated polyurethane dispersions, acrylated polyester dispersions, and water-soluble epoxy acrylates.

6. The water-based energy curable inkjet ink or coating composition of claim 1, wherein the one or more tertiary amines are present in an amount of 0.1 to 3.5 wt %.

7. The water-based energy curable inkjet ink or coating composition of claim 1, wherein the water is present in an amount of 20 wt % to 75 wt %.

8. The water-based energy curable inkjet ink or coating composition of claim 1, further comprising 0.1 wt % to 5 wt % one or more photoinitiators.

9. The water-based energy curable inkjet ink or coating composition of claim 1, further comprising 0.1 wt % to 40 wt % one or more water compatible solvents.

10. The water-based energy curable inkjet ink or coating composition of claim 1, further comprising 0.1 wt % to 15 wt % one or more water soluble monomers.

11. The water-based energy curable inkjet ink or coating composition of claim 1, further comprising 0.1 wt % to 30 wt % one or more colorants.

12. The water-based energy curable inkjet ink or coating composition of claim 1, further comprising 0.01 wt % to 5 wt % of one or more additives selected from the group consisting of biocides, defoamers, surface control additives, de-aerators, surfactants, and dispersants.

13. A method of preparing a water-based energy curable inkjet ink or coating composition, comprising the steps of:
    a) mixing 0.1 wt % to 3 wt % one or more synthetic rheology modifiers, 15 wt % to 45 wt % one or more energy curable resins, 0.1 wt % to 4 wt % one or more tertiary amines, and 20 wt % to 80 wt % water; and
    b) adjusting the pH to 7.0 to 9.5;
wherein the ink or coating composition exhibits Newtonian characteristics.

14. A printed article comprising the water-based energy curable inkjet ink or coating composition of claim 1.

15. A method of preparing a printed article comprising:
    a) applying the water-based energy curable inkjet ink or coating composition of claim 1 on a substrate;
    b) drying the water-based energy curable inkjet ink or coating composition; and
    c) curing the water-based energy curable inkjet ink or coating composition.

* * * * *